May 14, 1968   D. DAVIDOFF   3,383,605
PULSE REPETITION FREQUENCY FILTER WITH CONTINUOUSLY
VARIABLE UPPER AND LOWER LIMITS
Filed Nov. 4, 1964

INVENTOR.
Dorsey Davidoff,
BY
H. H. Losch,
Att'ys.

United States Patent Office 3,383,605
Patented May 14, 1968

3,383,605
PULSE REPETITION FREQUENCY FILTER WITH CONTINUOUSLY VARIABLE UPPER AND LOWER LIMITS
Dorsey Davidoff, New York, N.Y., assignor, by mesne assignments, to the United States of America as represented by the Secretary of the Navy
Filed Nov. 4, 1964, Ser. No. 409,036
6 Claims. (Cl. 328—138)

ABSTRACT OF THE DISCLOSURE

A pulse repetition frequency filter with adjustable upper and lower frequency limits having a first bistable multivibrator adjustable to establish a short unstable condition corresponding to the upper limit of pulse repetition frequency and a second bistable multivibrator adjustable to establish a long unstable condition corresponding to the lower limit of pulse repetition frequency, the multivibrator outputs being coupled to an output "and" gate to control same to conduct pulse repetition frequency signals connected to the "and" gate to gate through pulses within the upper and lower pulse repetition frequency limits to an alert multivibrator, the multivibrators being reset through a pair of input "and" circuits coupled to the pulse repetition frequency source and the multivibrators whenever the pulse repetition frequency is below the lower and above the upper pulse repetition frequency limits.

Background of the invention

This invention relates to pulse rate discrimination and more particularly to a circuit for detecting the pulse repetition frequency (PRF) of an incoming radar signal and determining whether the PRF lies within an upper and lower limit which can be preset by two continuously variable controls.

It is often desirable in radar detection to determine whether the radar signals being received occur within the expected PRF range of anticipated targets. In known radar devices the PRF signals are received and processed although they are above or below the PRF that real targets could produce, such as noise signals. Radar operating personnel are not aware of the difference in the received signals producing echoes of true targets from those caused by noise and thus waste time evaluating the noise signals. An alert signal, indicating that the PRF is within the range of expected PRF for real target echoes, would be helpful and time saving.

Summary of the invention

In the present invention a circuit is provided which has an input terminal for receiving the PRF radar echo signals to produce an alert signal on an output thereof whenever the PRF signals are above a lower limit preset into the circuit and below an upper limit preset into the circuit. The means for establishing the upper and lower PRF limits are by delay multivibrators in which the delay is adjustably variable for each multivibrator. The means for adjusting the delay of the lower limit PRF delay multivibrator and the delay of the upper limit PRF delay multivibrator is by a potentiometer adjustment for each in which the adjustments are so interlocked that the lower limit PRF delay multivibrator can never have a shorter delay than the upper limit PRF delay multivibrator. The input of PRF signals is through a pair of "and" gates to the delay multivibrators. The output of the delay multivibrators is through an "and" gate constructed and arranged to pass only the PRF signals which are within the range below the upper limit and above the lower limit established by the delay in the multivibrators. In eight possible combinations applied to the output "and" gate, only one combination will close the "and" gate to pass the pulse from the PRF input source to an alert multivibrator which provides an output for connection to an alerting means of any desirable choice to alert radar operating personnel that PRF echo signals are being received within an expected PRF range. Therefore, it is a general object of this invention to provide a PRF rate discriminator or filter circuit for detecting echo PRF radar signals within preset upper and lower PRF limits for alerting radar personnel that echo signals are being received within an expected range of PRF signals.

Brief description of the drawing

These and other objects and the attendant advantages, features, and uses of this invention will become more apparent to those skilled in the art as a more detailed description proceeds when considered along with the accompanying drawing, in which.

Description of the preferred embodiment

Figure 1:
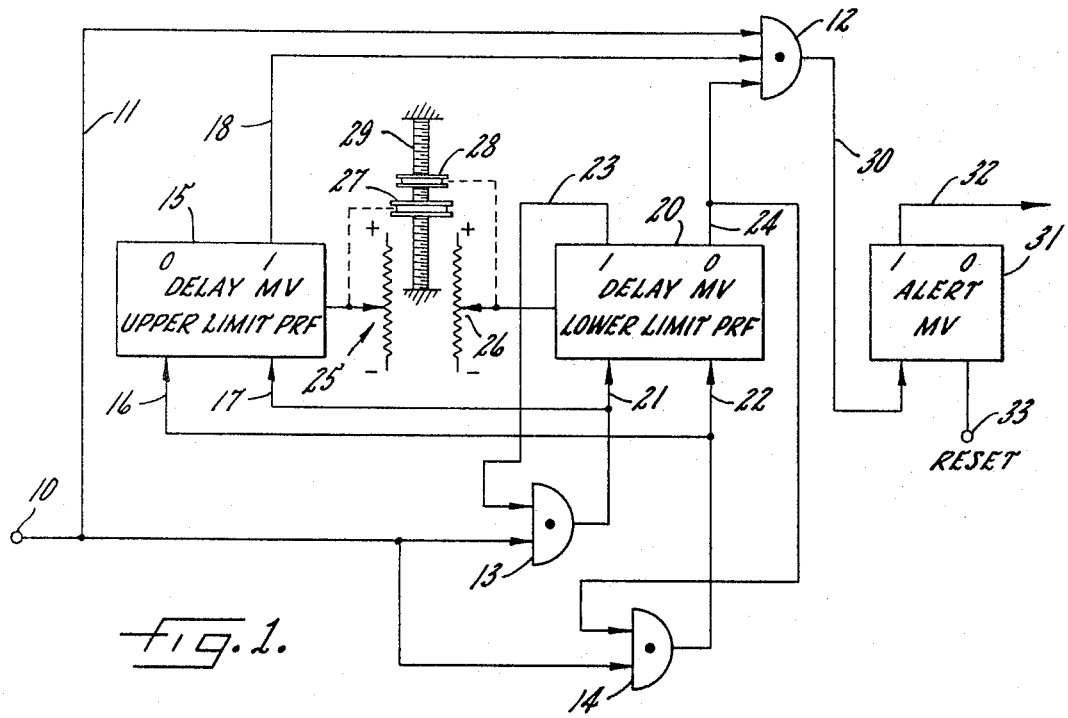
FIGURE 1 illustrates the circuit of this invention partially in block and partially in circuit schematic.

Referring more particularly to FIGURE 1, the PRF echo radar signals of target objects are adapted to be applied to an input terminal 10 of the circuit. Input terminal 10 is coupled by a conductor means 11 as one input to a three-input "and" gate 12 providing an output "and'" gate to the circuit, and as an input in common to one input each of two "and" gates 13 and 14. A first delay multivibrator 15, to establish the upper PRF limit, has two inputs 16 and 17 and a single output 18 coupled by way of a conductor means as a second input to the output "and" gate 12. A second delay multivibrator 20, to establish the lower PRF limit, has two inputs 21 and 22 and two outputs 23 and 24. The first delay multivibrator 15 has a delay established by potentiometer 25 while the second delay multivibrator 20 has a delay established by a potentiometer 26. The adjustable taps of potentiometers 25 and 26 are adjusted by knurled knobs 27 and 28, respectively, adjustably threaded on a stationary threaded shaft 29. The knurled knob 28 is adjustable above the knurled knob 27 such that the potentiometer 26 can never be adjusted to produce a delay in the multivibrator 20 which would be less than the delay in the delay multivibrator 15 adjusted by the knurled knob 27. The adjustment means 27–29 is illustrated herein merely as one means of adjusting the delay in each of the delay multivibrators 15 and 20 and not as a practical adjustment means since there are known control devices having concentric adjustable knobs which are interlocked to prevent the adjustment of one to become less than the adjustment of the other. Any of these interlocking and concentric control means, well known in the art, would be suitable for the adjustment of the delay in each of the delay multivibrators 15 and 20 herein.

The delay multivibrators 15 and 20 may be any of the well-known type, particularly of the known transistor multivibrators, in which the output 18 from the first multivibrator 15 and the outputs 23 and 24 from the delay multivibrator 20 are connected to the collectors of the multivibrator circuits, and the inputs, such as 16, 17, 21, and 22, are coupled to the base circuits of these multivibrators. The adjustable taps of the potentiometers 25 and 26 may be coupled to the emitters to vary the biases thereon and thereby vary the delay of the multivibrator circuits. As is also well-known of multivibrator circuits, the delay is produced by the time interval established by resistor-capacitance networks to switch the multivibrator circuit from an unstable state to a stable state, the potentiometers providing the resistive elements herein. For example, the delay multivibrator 20 would be normally resting in a stable state, referred to as the "0" state, in which the output terminal 24 would have a voltage produced thereon and the output 23 would have no voltage output. Any trigger voltage, such as a positive trigger, on the input 22 would trigger the multivibrator 20 from its "0" state, being the stable state, to its "1" or unstable state. The "1" state of delay multivibrator 20 is the unstable state since this delay multivibrator will trip itself back to the "0" state after a period of time established by the adjusted means 26, 28. To change the state of the delay multivibrator 20 from its unstable state, being the "1" state, to its stable or "0" state before the delay time ends it is only necessary to apply the proper pulse to the input terminal 21. The delay multivibrator 15 operates in the same manner except that no output is taken from it in the "0" state. Accordingly, the delay multivibrators 15 and 20 will have an output voltage established on the output 18 of multivibrator 15, in the "1" state of this multivibrator, and a voltage output on either 23 or 24, depending on the switched state of this delay multivibrator.

Figure 2:
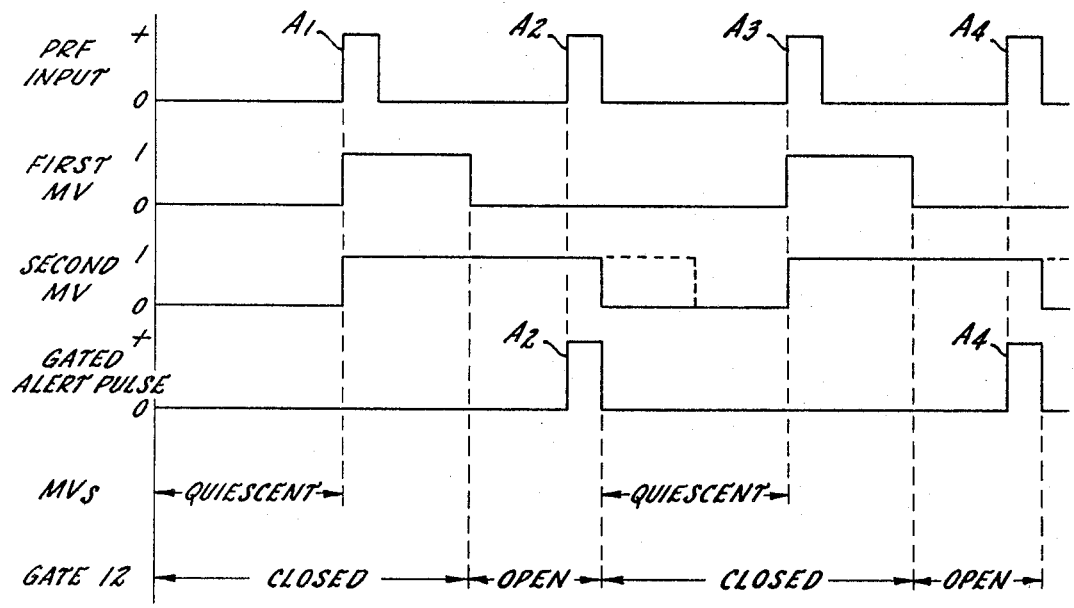
FIGURE 2 illustrates in graph form the received PRF pulses, the quiescent and active states of the first and second multivibrators, and the gated output pulses of the PRF input signals.

The triggering inputs 17 and 21 of the delay multivibrators 15 and 20, respectively, are coupled in common and this common coupling is connected to the output of the "and" gate 13. In like manner, the triggering input terminals 16 and 22 of the delay multivibrators 15 and 20, respectively, are coupled in common to the output of "and" gate 14. The output 23 of delay multivibrator 20 is coupled as the second input to "and" gate 13 while the output 24 of the multivibrator 20 is coupled as a second input to the "and" gate 14. The output 24 is also coupled as the third input to the output "and" gate 12. The output of "and" gate 12 is coupled by way of conductor means 30 as a triggering input to an alert multivibrator 31 to trigger the alert multivibrator to produce a voltage signal on its output 32 whenever this multivibrator is triggered to its "1" state. The alert multivibrator 31 can be bistable and thus reset by proper resetting voltage applied to terminal 33. The output 32 may be coupled to any audio or visual or other alert means to notify radar personnel that the echo PRF signals applied to terminal 10 are within the upper and lower limits of the PRF established by the delay multivibrators 15 and 20. To accomplish this the output "and" gate 12 will only pass a pulse of the PRF input signals at terminal 10 over the conductor means 11 through the "and" gate 12 over the output 30 when the delay multivibrator 15 is in its "0" state, at which time no voltage is applied over the output conductor 18 to the "and" gate 12, and in which the delay multivibrator 20 is in its "1" state, at which time zero voltage is on the output 24 as a third input to the "and" gate 12, as shown in FIGURE 2. In all seven other combinations applied to the output "and" gate 12 this "and" gate will be closed and no PRF signals from terminal 10 will pass through the "and" gate 12.

*Operation*

In the operation of the device, in the absence of any PRF input signals being applied to terminal 10, the delay multivibrators 15 and 20 will be in their "0" state at which time the output "and" gate 12 is closed to the passage of any PRF pulses over conductor 11 to conductor 30. Now let it be assumed that echo PRF signals are received on terminal 10 as shown by the top line in FIGURE 2 of pulses A1, A2, A3, and A4. When the first pulse A1 is applied to "and" gates 12, 13, and 14, only "and" gate 14 is open to pass this pulse to the input terminal 22 of delay multivibrator since multivibrator 20 is resting in its "0" state and output 24 with a voltage thereon is coupled as a second input to "and" gate 14. This PRF pulse A1 is applied to input terminal 22 of delay multivibrator 20, as well as input terminal 16 of delay multivibrator 15, tripping both of these multivibrators to the "1" state. Now, if the second PRF pulse A2 should arrive before the delay multivibrator 15 has switched back to the "0" state, this PRF pulse A2 would be blocked by the output "and" gate 12 since the delay multivibrators 15 and 20 are not in the proper states to apply zero voltages to the respective two inputs of "and" gate 12 to pass the pulse. Since the upper limit of the delay of multivibrator 15 is adjusted to receive exected PRF signals, the delay multivibrator 15 would switch after its preset delay from its "1" state to its "0" state, as shown in the second line from the top of FIGURE 2. Delay multivibrator 15 is now in its "0" state while delay multivibrator 20 is in its "1" state. This will condition gate 12 with zero voltages on the inputs to "and" gate 12 to pass a pulse from terminal 10 via conductor 11 to the output 30 if this pulse arrives before the delay multivibrator 20 reverts to its stable "0" state. As shown in the third line from the top in FIGURE 2, pulse A2 arrives while the delay multivibrator 15 is in its "0" state and while the second delay multivibrator 20 is in its "1" state thereby passing the pulse A2 to the output of the output "and" gate 12 over conductor 30 to switch the alert multivibrator 31 from its "0" state to its "1" state producing an alert signal over the output conductor 32. The alert multivibrator 31 may be of the delay type to reset itself to the "0" state after a preset period of time, or it may be of the bistable type to be reset by applying the proper voltage signal to terminal 33 as desired. This choice can be exercised by the designer and user of the invention.

When the PRF pulse A2 is conducted by way of the conductor means 11 through the "and" gate 12, this pulse is applied likewise through the "and" gate 13 to input terminals 17 and 21 of the delay multivibrators 15 and 20 which will trigger delay multivibrator 20 back to its stable or "0" state as shown in line 3 from the top of FIGURE 2. Also, as shown in line 3 from the top of FIGURE 2, the dotted line portion represents the delay time which delay multivibrator 20 would have stayed in its "1" state, establishing the lower PRF limit, if the pulse A2 had not arrived. The pulse A2 being applied to the input terminal 17 would have switched delay multivibrator 15 to its stable, or "0" state, had it not already been in this state. If pulse A2 had arrived to the right of the dotted line wave portion in line 3 of FIGURE 2, delay multivibrator 20 would have returned to its stable or "0" state before the arrival of the pulse A2. This would have closed the output gate 12 to the passage of the signal A2 to the output 30 and, accordingly, no alert signal would have been established since the PRF of signals A1, A2, A3, and A4 would have been at such low frequency as to be eliminated by the lower PRF limit of delay multivibrator 20. On the other hand, if the PRF of A1 through A4 had been so high that A2 would have arrived within the period of time that the first delay multivibrator 15 had been in its "1" state, as shown by the second line from the top of FIGURE 2, gate 12 again would have been closed. This occurs when the PRF is high enough to be in the frequency range of noise and, accordingly, the circuit of this invention provides definite noise rejecting capabilities. As an example, the PRF limits for the delay multivibrators 15 and 20 may be adjusted by the control knobs 27 and 28 to produce a lower limit of 25 cycles and an upper limit of 25 kilocycles so that any noise signals outside these limits would be rejected. As may be realized from the above description, the delay multivibrators 15 and 20 remain quiescent as shown in the fifth line from the top in FIGURE 2 until the first, third, and fifth, etc., PRF pulses are received. As shown in the last line of FIGURE 2, the output "and" gate 12 is closed for all conditions except when the first multivibrator is in its "0" state and the second multivibrator is in its "1" state. Accordingly, the circuit of this invention will provide an alert signal whenever the PRF is within the preset limits of PRF of any expected echo signal received by radar equipment. Radar personnel, then, need only concern themselves with selecting targets within this PRF limited range of signals and eliminate all noise or other spurious signals outside this limited range.

While many modifications and changes may be made in the constructional details and features of this invention to adapt the invention for particular circumstances, it is to be understood that I desire to be limited only in the teaching and spirit of my invention as established by the scope of the appended claims.

I claim:
1. A pulse repetition filter with continuously variable upper and lower limits comprising:
   a pair of delay multivibrators, each having two inputs with corresponding inputs coupled in common, one having one output, and the other having two outputs;
   an input "and" gate for each of said two corresponding inputs with the output of each coupled to each said input of said two inputs coupled in common, respectively, with the two outputs of said other delay multivibrator coupled, respectively, as one input to each of said "and" gates, and with another input of each of said "and" gates coupled in common to an input terminal; and
   a three input "and" gate having an output, one input coupled to said input terminal, another input coupled to said one output of said one delay multivibrator, and the third input coupled to one of said two outputs of said other delay multivibrator whereby a preselected condition for said three input "and" gate and a delay of said other delay multivibrator longer than the delay of said one delay multivibrator will filter all but a predetermined range of frequency of pulses applied to said input terminal.

2. A pulse repetition filter with continuously variable upper and lower limits comprising:
   a pair of delay bistable multivibrators, each having two inputs with corresponding inputs coupled in common, one having one unstable state output, and the other having two outputs one being a stable state output and the other being an unstable state output;
   means coupled to each of said pair of delay multivibrators to vary the delay thereof, said means being interlocked to prevent said other delay multivibrator from producing a shorter delay than said one delay multivibrator;
   an input "and" gate for each of the two corresponding inputs of said delay multivibrators coupled to the output thereof with the two outputs of said other delay multivibrator coupled, respectively, as one input to each of said input "and" gates, and with another input of each input "and" gate coupled in common to an input terminal; and
   a three input "and" gate having an output, one input coupled to said input terminal, another input coupled to said one unstable state output of said one delay multivibrator, and the third input coupled to said stable state output of said other delay multivibrator whereby a preselected condition for said three input "and" gate will filter all but a predetermined range of frequency of pulses applied to said input terminals.

3. A pulse repetition filter as set forth in claim 2 wherein said means coupled to each of said pair of delay multivibrators to vary the delay thereof consists of an adjustable voltage with adjustment means to limit the voltage applied to said other delay multivibrator by the adjusted voltage applied to said one delay multivibrator.

4. A pulse repetition filter with continuously variable upper and lower limits comprising:
   first and second delay multivibrators, each having a first and second input, the first delay multivibrator having one output triggered by the second input and the second delay multivibrator having first and second outputs triggered by said first and second inputs, respectively;
   first and second "and" gates each having an output coupled in common to said first inputs and in common to said second inputs, respectively, of said delay multivibrators, one input of each "and" gate being coupled to the first and second outputs, respectively, of said second delay multivibrator, and the other input of each "and" gate being coupled in common to an input terminal; and
   a three input "and" gate having one input coupled to said input terminal, a second input coupled to said one output of said first delay multivibrator, and the third input coupled to the second output of said second delay multivibrator whereby a preselected condition for said three input "and" gate and a delay of said second delay multivibrator longer than said first delay multivibrator will filter all but a predetermined range of frequency of pulses applied to said input terminal.

5. A pulse repetition filter with continually variable upper and lower limits comprising:
   first and second delay multivibrators, each having a first input coupled in common and a second input coupled in common, the first delay multivibrator having an unstable state output, and the second delay multivibrator having an unstable state output and a stable state output;
   means coupled to each of said delay multivibrators to vary the delay thereof, said means being interlocked to prevent said second delay multivibrator from producing a shorter delay on said unstable state output than the delay on said unstable state output of said first delay multivibrator;
   first and second input "and" gates, the first having an output coupled to the first input of said delay multivibrators and one of its inputs coupled to said unstable state output of said second delay multivibrator, the second "and" gate having an output coupled to the second input of said delay multivibrators and one of its inputs coupled to said stable state output of said second delay multivibrator, and another input of said first and second "and" gates being coupled in common to an input terminal of pulse repetition frequency signals;
   an output "and" gate having a first input coupled to said input terminal, a second input coupled to said unstable state output of said first delay multivibrator, and a third input coupled to said stable state output of said second delay multivibrator; and
   an alert multivibrator having an input coupled to the output of said output "and" gate and an output producing an output voltage signal upon the application of an output signal from said output "and" gate whereby a pulse on said input terminal will be conducted through said output "and" gate when the repetition frequency of at least two pulses of said pulse repetition frequency is below the limit adjusted by said means in said first delay multivibrator and above the limit adjusted by said means in said second delay multivibrator to activate said alert multivibrator, and said output "and" gate is constructed and arranged to open to pass pulses from said input terminal of pulse repetition frequency signals when said first delay multivibrator is in its stable state and said second delay multivibrator is in said unstable state.

6. A pulse repetition filter as set forth in claim 5 wherein said means coupled to each of said delay multivibrators is an adjustment for varying a voltage to vary the delay period in which the adjustment to vary the delaying voltage to said second delay multivibrator is interlocked with the adjustment to vary the delaying voltage to said first delay multivibrator to preevnt the delay of said second delay multivibrator from becoming less than the delay of said first delay multivibrator.

References Cited

UNITED STATES PATENTS

| | | | |
|---|---|---|---|
| 2,716,189 | 8/1955 | Ayres | 328—138 X |
| 3,146,432 | 8/1964 | Johnson | 328—138 X |
| 3,230,461 | 1/1966 | Dix et al. | |

JOHN S. HEYMAN, *Primary Examiner.*